US010616953B2

United States Patent
Shi et al.

(10) Patent No.: US 10,616,953 B2
(45) Date of Patent: Apr. 7, 2020

(54) NETWORK MESSAGE NOTIFICATION APPARATUS AND METHOD AND COMMUNICATION SYSTEM

(71) Applicant: FUJITSU LIMITED, Kawasaki-shi, Kanagawa (JP)

(72) Inventors: Yulong Shi, Beijing (CN); Wei Xi, Beijing (CN); Haibo Xu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/011,965

(22) Filed: Jun. 19, 2018

(65) Prior Publication Data
US 2018/0302949 A1 Oct. 18, 2018

Related U.S. Application Data

(63) Continuation of application No. PCT/CN2015/100094, filed on Dec. 31, 2015.

(51) Int. Cl.
| | |
|---|---|
| *H04W 88/02* | (2009.01) |
| *H04L 29/08* | (2006.01) |
| *H04L 29/12* | (2006.01) |
| *H04W 68/00* | (2009.01) |
| *H04W 68/02* | (2009.01) |

(Continued)

(52) U.S. Cl.
CPC .......... *H04W 88/023* (2013.01); *H04L 29/08* (2013.01); *H04L 61/6054* (2013.01); *H04L 61/6095* (2013.01); *H04L 67/12* (2013.01); *H04W 68/005* (2013.01); *H04W 68/02* (2013.01); *H04W 4/70* (2018.02); *H04W 8/26* (2013.01); *H04W 88/06* (2013.01)

(58) Field of Classification Search
None
See application file for complete search history.

(56) References Cited

U.S. PATENT DOCUMENTS

2004/0243682 A1 12/2004 Markki et al.
2004/0260701 A1 12/2004 Lehikoinen et al.
(Continued)

FOREIGN PATENT DOCUMENTS

| | | |
|---|---|---|
| CN | 1823332 A | 8/2006 |
| CN | 101534460 A | 9/2009 |

OTHER PUBLICATIONS

International Search Report issued for corresponding International Patent Application No. PCT/CN2015/100094, dated Sep. 21, 2016, with an English translation.

(Continued)

*Primary Examiner* — Anh Vu H Ly
(74) *Attorney, Agent, or Firm* — Myers Wolin, LLC

(57) ABSTRACT

A network message notification apparatus and method and a communication system. The method includes: receiving a network message transmitted by a network device; the network message including indication information indicating a user identity range; parsing the indication information and determining whether a user identity of the UE falls within the user identity range indicated by the indication information; and determining whether the UE is notified by the network message according to a determination result. Hence, a magnitude of a network message in the communication system may be greatly reduced, and more UEs may be notified by using relatively few resources.

13 Claims, 11 Drawing Sheets

(51) Int. Cl.
*H04W 8/26* (2009.01)
*H04W 4/70* (2018.01)
*H04W 88/06* (2009.01)

(56) References Cited

U.S. PATENT DOCUMENTS

| | | | | |
|---|---|---|---|---|
| 2005/0083937 | A1* | 4/2005 | Lim | H04L 45/08 |
| | | | | 370/392 |
| 2012/0040700 | A1* | 2/2012 | Gomes | H04W 4/08 |
| | | | | 455/500 |
| 2012/0057496 | A1* | 3/2012 | Jin | H04W 68/00 |
| | | | | 370/252 |
| 2013/0136072 | A1* | 5/2013 | Bachmann | H04W 4/70 |
| | | | | 370/329 |
| 2013/0344903 | A1* | 12/2013 | Li | H04W 4/08 |
| | | | | 455/458 |
| 2017/0142560 | A1* | 5/2017 | Ryu | H04W 4/08 |
| | | | | 370/392 |

OTHER PUBLICATIONS

Written Opinion of the International Searching Authority issued for corresponding International Patent Application No. PCT/CN2015/100094, dated Sep. 21, 2016, with an English translation.

* cited by examiner

NETWORK MESSAGE NOTIFICATION APPARATUS AND METHOD AND COMMUNICATION SYSTEM

CROSS REFERENCE TO RELATED APPLICATIONS

This application is a continuation application of International Application PCT/CN2015/100094 filed on Dec. 31, 2015, the entire contents of which are incorporated herein by reference.

TECHNICAL FIELD

This disclosure relates to the field of communication technologies, and in particular to a network message notification apparatus and method and a communication system.

BACKGROUND

Internet of Things (IoT) is more and more widely used in the next generation of mobile communication networks. A traffic of IoT has many new features, including extra low power consumption requirement, deployment of massive user equipments (UEs), relatively less flow of data, and low requirement on traffic latency, etc. Such features pose many technical requirements to an LTE (Long Term Evolution) system, in which an important requirement includes supporting massive UEs.

A new wireless communication technology for supporting IoT traffics, i.e. a subject of a technology of narrow band Internet of Things (NB-IoT), is under study in the 3rd generation partnership project (3GPP).

The NB-IoT technology is a new narrow band communication technology based on the existing LTE technology and further enhanced to satisfy IoT traffic demands. A physical layer technology of the NB-IoT is based on a wireless bandwidth of 200 kHZ. Relative to a legacy LTE system, frequency domain resources that may be used by the UE are outstandingly reduced. Although such a design may efficiently lower complexity of the UE, it makes effective data that can be transmitted by the UE in each subframe become less. In general cases, the amount of data traffic of each NB-IoT UE is relatively small, and the demand for radio resources is not large. Hence, such a design is reasonable.

And on the other hand, in a paging scheme of an LTE system, a UE calculates a paging occasion (PO) of itself according to a parameter configured by a network device. When data traffic has arrived at a certain UE, a mobility management entity (MME) transmits a paging message to a base station (such as an eNB), and the base station transmits a paging message within a PO of the UE. For example, the paging message is carried by a physical downlink shared channel (PDSCH) indicated by downlink control information (DCI) in a physical downlink control channel (PDCCH).

After the UE decodes the paging message on the PDSCH, if a user identity (or may be referred to as UE identity) contained in the paging message is identical to that of the UE itself, it shows that the UE is paged, and a connection establishment request should be initiated. The user identity in the paging message may be an international mobile subscriber identification (IMSI) or may be a temporary mobile subscriber identity (S-TMSI). Each paged UE is denoted by a user identity record, and user identities of multiple paged UEs constitute a paging message, which is carried on a PDSCH.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that an IMSI or an S-TMSI is taken as a user identity of each UE in the paging scheme of the LTE system, and each user identity needs an effective payload of 40-70 bits to carry. And the LTE system permits that at most 16 UEs are paged on each PSDCH.

However, in some communication system (such as NB-IoT) cells, the number of UEs is much higher than that in a legacy LTE cell, and for some specific traffic (such as traffic of a network command type), it is possible that many UEs are paged in a certain PO. Hence, the NB-IoT system requires that a PDSCH carries more UE identities than an LTE system does.

However, according to physical layer technical features of these communication systems (such as the above NB-IoT), the effective payload that can be carried by the PDSCH in these communication systems is much less than that in the LTE system. Thus, a contradiction between limited PDSCH effective payload and requirement of paging more UEs in a PO exists in these communication systems (such as the NB-IoT), which urgently needs to be overcome.

Embodiments of this disclosure provide a network message notification apparatus and method and a communication system, in which a magnitude of a network message (such as a paging message) in a communication system (such as the NB-IoT) is reduced, so that the communication system may notify (such as paging) more UEs by using relatively few resources.

According to a first aspect of the embodiments of this disclosure, there is provided a network message notification method, including:

receiving, by a user equipment (UE), a network message transmitted by a network device;
the network message including indication information indicating a user identity range;
parsing the indication information and determining whether a user identity of the UE falls within the user identity range indicated by the indication information; and
determining whether the UE is notified by the network message according to a determination result.

According to a second aspect of the embodiments of this disclosure, there is provided a network message notification apparatus, configured in a UE, the network message notification apparatus including:

a message receiving unit configured to receive a network message transmitted by a network device; the network message including indication information indicating a user identity range;
an identity determining unit configured to parse the indication information and determine whether a user identity of the UE falls within the user identity range indicated by the indication information; and
a notification determining unit configured to determine whether the UE is notified by the network message according to a determination result of the identity determining unit.

According to a third aspect of the embodiments of this disclosure, there is provided a network message notification method, including:

generating, by a network device, a network message used for notifying UEs; the network message including indication information indicating a user identity range; and transmitting the network message to one or more UEs, so that the one or more UEs determine whether they are notified by the network message according to whether their user identities fall within the user identity range.

According to a fourth aspect of the embodiments of this disclosure, there is provided a network message notification apparatus, configured in a network device, the network message notification apparatus including:

a message generating unit configured to generate a network message used for notifying UEs;

the network message including indication information indicating a user identity range; and a message transmitting unit configured to transmit the network message to one or more UEs, so that the one or more UEs determine whether they are notified by the network message according to whether their user identities fall within the user identity range.

According to a fifth aspect of the embodiments of this disclosure, there is provided a communication system, including:

a network device configured with the network message notification apparatus as described in the fourth aspect; and a user equipment configured with the network message notification apparatus as described in the second aspect.

An advantage of the embodiments of this disclosure exists in that whether the UE is notified by the network message is determined according to whether the user identity of the UE falls within the user identity range indicated by the indication information. Hence, a magnitude of a network message (such as a paging message) in the communication system (such as an NB-IOT system) may be greatly reduced, and more UEs may be notified (such as paged) by using relatively few resources.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
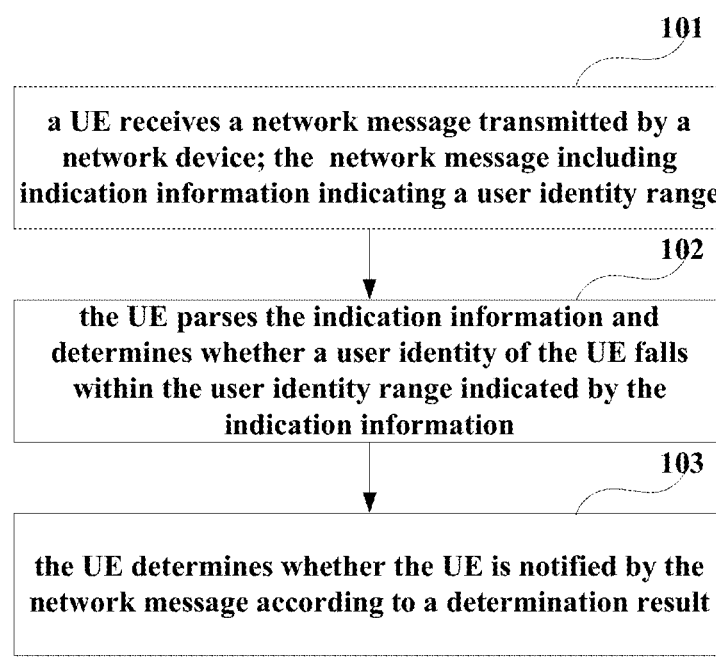
FIG. 1 is a schematic diagram of the network message notification method of Embodiment 1 of this disclosure.

The embodiment of this disclosure provides a network message notification method. FIG. 1 is a schematic diagram of the network message notification method of the embodiment of this disclosure, which shall be described from a UE side. As shown FIG. 1, the network message notification method includes:

Block 101: a UE receives a network message transmitted by a network device; the network message including indication information indicating a user identity range.

Block 102: the UE parses the indication information and determines whether a user identity of the UE falls within the user identity range indicated by the indication information; and Block 103: the UE determines whether the UE is notified by the network message according to a determination result.

In this embodiment, the UE may be, for example, a terminal of an NB-IoT. However, this disclosure is not limited thereto; for example, the UE may also be a terminal of another network system. The embodiments of this disclosure shall be described by taking an NB-IoT as an example only. However, this disclosure is not limited thereto, and it is also applicable to any system where network message notification is performed.

In this embodiment, the network device may be a base station, or may be an MME, etc. For example, the base station may be a macro base station (such as an eNB), and the UE may be served by a macro cell generated by the macro base station. Alternatively, the base station may also be a pico base station, and the UE may be served by a pico cell generated by the pico base station. However, this disclosure is not limited thereto, and a particular scenario may be determined according to an actual situation.

In this embodiment, the indication information may indicate one or more user identity ranges; any UE of which the user identity falls within the user identity range and which is capable of receiving the network message is the UE notified by the network message, or any UE of which the user identity falls within the user identity range and which is capable of receiving the network message is the UE not notified by the network message.

For example, as described later, multiple bits corresponding to a binary tree are used to indicate the range of identities of the UEs that are paged. However, this embodiment is not limited thereto; for example, starting information (such as 100) and ending information (such as 1000) indicating a user identity range may be directly transmitted, denoting that all of the multiple UEs of which the UE identities fall within the range (100, 1000) and which are capable of receiving the network message (such as monitoring a PDCCH at a corresponding PO) are notified, or denoting that all of the multiple UEs of which the UE identities fall within the range (100, 1000) and which are capable of receiving the network message are not notified (that is, all of the multiple UEs of which the UE identities do not fall within the range and which are capable of receiving the network message are notified).

In this embodiment, the network message may be a paging message, the paging message being used for paging one more UEs. When a user identity of a UE falls within the user identity range indicated by the indication information, it may be determined that the UE is paged by the paging message. And the embodiments of this disclosure shall be described by taking a paging message as an example only. However, the embodiments are not limited thereto, and are applicable to any network message.

In this embodiment, the user identity (such as being denoted by ue_indendity) may be an IMSI, or an S-TMSI, etc., of the UE. And which is selected as ue_indendity may be predefined in a protocol, only if an agreement is made between the UE and the network device (such as an MME).

Furthermore, a whole user identity range [ue_indendity$_{min}$, ue_indendity$_{max}$] may be predefined; a minimum value ue_indendity$_{min}$ and a maximum value ue_indendity$_{max}$ of the whole user identity range are both real numbers. Moreover, the UE may receive the maximum value and/or the minimum value of the whole user identity range transmitted by the network device, and determine the whole user identity range accordingly.

For example, it is assumed that a value range of ue_indendities of all UEs under the MME is [0, M]; where, M is greater than or equal to possible values of ue_indendities of all UEs under a current MME. M may be a fixed value specified in a protocol (for example, M may be a maximum value of all possible values of the IMSI and the S-TMSI), or may be a variable configured by the MME via a broadcast message according to a current network condition.

Figure 2:
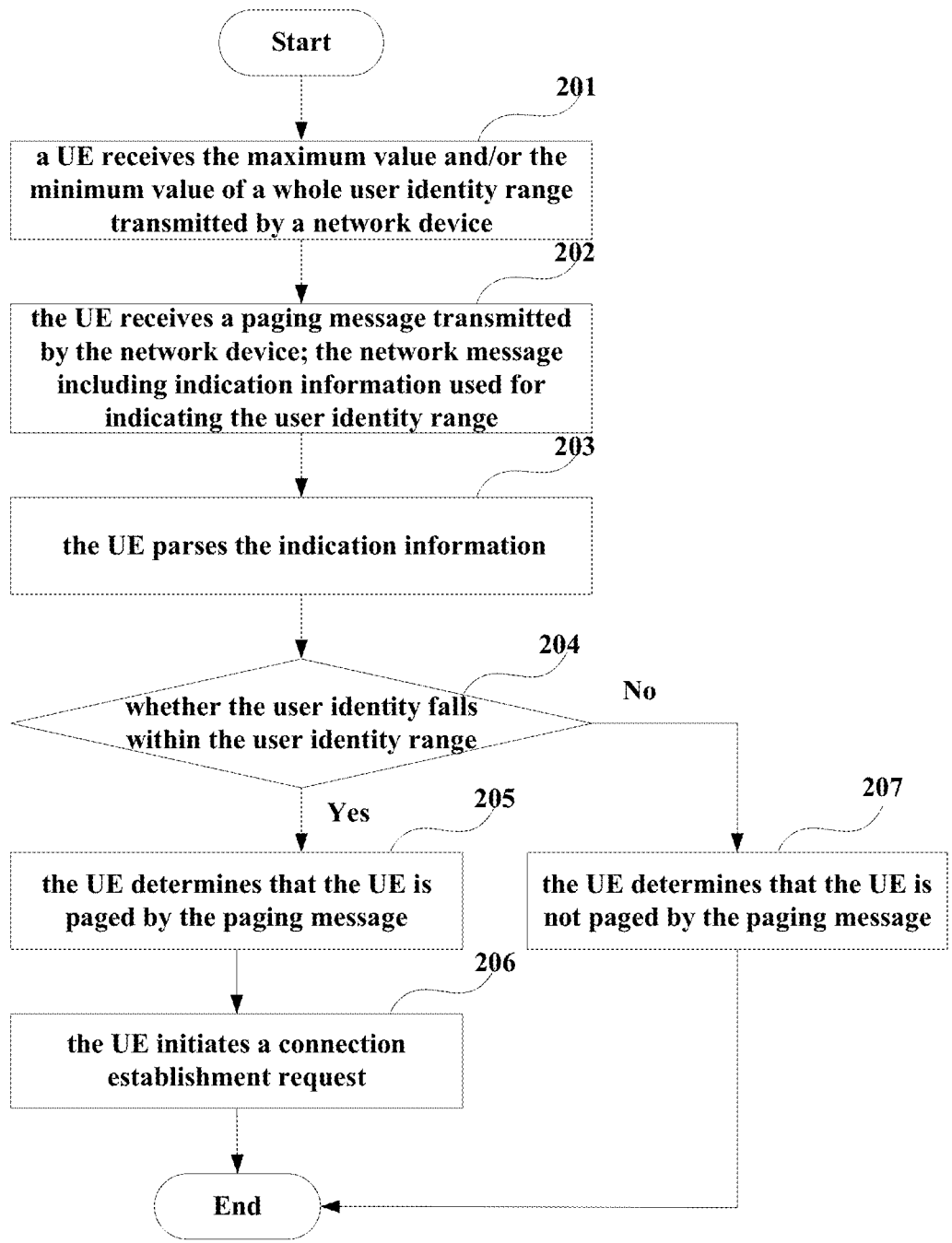
FIG. 2 is another schematic diagram of the network message notification method of Embodiment 1 of this disclosure.

FIG. 2 is another schematic diagram of the network message notification method of the embodiment of this disclosure, which shall be described from the UE side by taking a paging message as an example. As shown FIG. 2, the network message notification method includes:

Block 201: a UE receives the maximum value and/or the minimum value of the whole user identity range transmitted by the network device, and determines the whole user identity range.

Block 202: the UE receives a paging message transmitted by the network device; the network message including indication information used for indicating the user identity range;

for example, the paging message is carried by a PDSCH; and the UE monitors a PDCCH at a corresponding PO, and decodes a PDSCH indicated by DCI in the PDCCH, so as to obtain the paging message carried by the PDSCH.

Block 203: the UE parses the indication information;

for example, the indication information is parsed into a corresponding binary tree, as described below.

Block 204: the UE determines whether the user identity of the UE falls within the user identity range indicated by the indication information; executing block 205 if it is determined yes, and executing block 207 if it is determined no.

Block 205: the UE determines that the UE is paged by the paging message.

Block 206: the UE initiates a connection establishment request if it is determined that the UE is paged by the paging message; and Block 207: the UE determines that the UE is not paged by the paging message.

Hence, the indication information indicating the user identity range is used to notify the UE, which may greatly reduce a magnitude of a network message in the communication system, and more UEs may be notified by using relatively few resources.

Following description shall be given by taking that the indication information is multiple bits corresponding to a binary tree as an example, the binary tree indicating that one or more UEs are paged by the paging message. For example, it may be assumed that the number of UEs at a PO is m, in which n UEs are paged, and other UEs are not paged; where, both m and n are positive integers, and m is greater than or equal to n. However, this disclosure is not limited thereto; for example, the indication information may also use other data structures, etc.

In this embodiment, the whole user identity range [ue_indendity$_{min}$, ue_indendity$_{max}$] may be divided into multiple ranges by nodes of the binary tree, and each leaf node and a parent node of the leaf node correspond to a user identity range [ue_indendity$_j$, ue_indendity$_k$] notified by the network message; where, ue_indendity$_{min}$, ue_indendity$_{max}$, ue_indendity$_j$, ue_indendity$_k$ are all real numbers, and ue_indendity$_{min}$≤ue_indendity$_j$<ue_indendity$_k$≤ue_indendity$_{max}$.

Each two bits may correspond to a node of the binary tree, a corresponding binary tree may be obtained based on the indication information by using a method of breadth-first traversal or a method of depth-first traversal of a binary tree; selection of the method may be predefined in a protocol, only if an agreement is made between the UE and the network device.

Table 1 shows a correspondence between nodes of a binary tree and bits.

TABLE 1

| Node shape | Feature | Denoting Bits | |
|---|---|---|---|
| | | Left | Right |
| ⋀ | Binary tree | 1 | 1 |
| ╱ | Left sub-tree | 1 | 0 |
| ╲ | Right sub-tree | 0 | 1 |
| ● | Leaf node | 0 | 0 |

Figure 3:
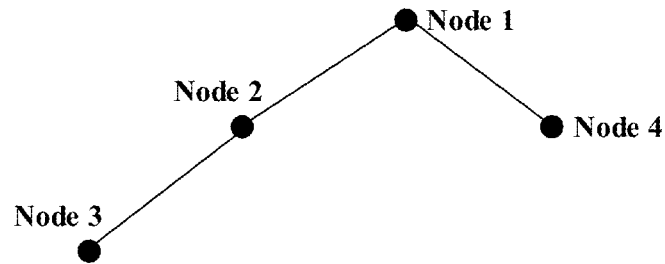
FIG. 3 is a schematic diagram of the binary tree of Embodiment 1 of this disclosure.

FIG. 3 is a schematic diagram of the binary tree of the embodiment of this disclosure. For example, the indication information is a binary string of bits "11100000", and according to the method of breadth-first traversal, the binary tree shown in FIG. 3 may be generated; wherein, "11" corresponds to the node 1, "10" corresponds to the node 2, "00" corresponds to the node 3, and "00" corresponds to the node 4.

Assuming that the whole user identity range is [0, 1000], as shown in FIG. 3, each node of the binary tree may correspond to a value in the whole user identity range. For example, node 1 corresponds to 500, node 2 corresponds to 250, node 3 corresponds to 125, and node 4 corresponds to 750. The binary tree has two leaf nodes (i.e. the node 3 and the node 4), the leaf node 3 and its parent node 2 corresponding to a user identity range [125, 250], and the leaf node 4 and its parent node 1 corresponding to a user identity range [500, 1000].

It should be noted that the value to which each node in the above example is obtained by taking a median value mid=(start+end)/2 as an example. However, this disclosure is not limited thereto, and other values may also be used. For example, node 1 corresponds to 250, node 2 corresponds to 125, node 3 corresponds to 62.5, and node 4 corresponds to 875, etc.

Figure 4:
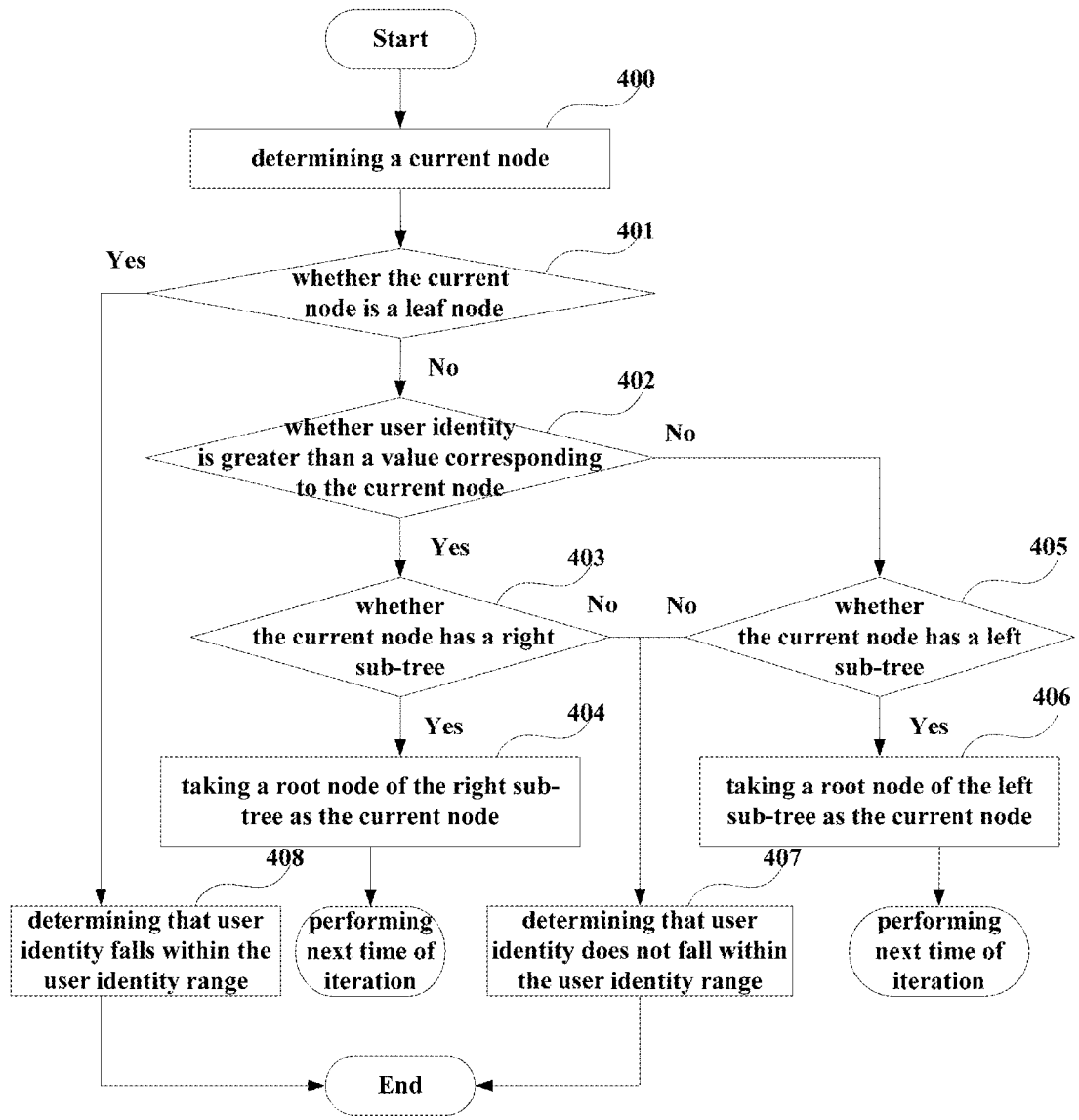
FIG. 4 is a partial schematic diagram of determining whether the user identity falls within the user identity range of Embodiment 1 of this disclosure.

FIG. 4 is a partial schematic diagram of determining whether the user identity falls within the user identity range of the embodiment of this disclosure, in which a time of iteration is particularly shown. As shown in FIG. 4, the method includes:

Block 400: a current node is determined;
in a first time of iteration, a root node of the binary tree may be initialized as the current node.

Block 401: it is determined whether the current node is a leaf node, executing block 402 when the current node is not a leaf node, and executing block 408 when the current node is a leaf node.

Block 402: it is determined whether the user identity of the UE is greater than a value to which the current node corresponds, executing block 403 when the user identity of the UE is greater than the value to which the current node corresponds, and executing block 405 when the user identity of the UE is less than or equal to the value to which the current node corresponds.

Block 403: it is determined whether the current node has a right sub-tree, and executing block 404 when the current node has a right sub-tree, otherwise, executing block 407.

Block 404: a root node of the right sub-tree is taken as the current node; terminating this time of iteration, and proceeding with executing block 401 for next time of iteration.

Block 405: it is determined whether the current node has a left sub-tree, and executing block 406 when the current node has a left sub-tree, otherwise, executing block 407.

Block 406: a root node of the left sub-tree is taken as the current node, terminating this time of iteration, and proceeding with executing block 401 for next time of iteration.

Block 407: it is determined that the user identity of the UE does not fall within the user identity range indicated by the indication information; and Block 408: it is determined that the user identity of the UE falls within the user identity range indicated by the indication information.

FIG. 4 only schematically shows a case of one time of iteration. And for each current node after being updated, the above blocks or steps may be executed iteratively, so as to determine whether the user identity of the UE falls within the user identity range indicated by the indication information.

Taking the binary tree shown in FIG. 3 as an example, it is assumed that the user identity of the UE is 200. In a first time of iteration, the current node is node 1 (the node 1 is not a leaf node and its corresponding value is 500), 200 is less than 500 and the node 1 has a left sub-tree, a root node of the left sub-tree (i.e. the node 2) is taken as the current node. In a second time of iteration, the current node is node 2 (the node 2 is not a leaf node and its corresponding value is 250), 200 is less than 250 and the node 2 has a left sub-tree, a root node of the left sub-tree (i.e. the node 3) is taken as the current node. And in a third time of iteration, the current node is node 3, the node 3 is a leaf node, and it may be determined that the user identity of the UE falls within the user identity range indicated by the indication information.

Still taking the binary tree shown in FIG. 3 as an example, it is assumed that the user identity of the UE is 400. In a first time of iteration, the current node is node 1 (the node 1 is not a leaf node and its corresponding value is 500), 400 is less than 500 and the node 1 has a left sub-tree, a root node of the left sub-tree (i.e. the node 2) is taken as the current node. In a second time of iteration, the current node is node 2 (the node 2 is not a leaf node and its corresponding value is 250), 400 is greater than 250 and the node 2 does not have a right sub-tree, and it may be determined that the user identity of the UE does not fall within the user identity range indicated by the indication information.

Still taking the binary tree shown in FIG. 3 as an example, it is assumed that the user identity of the UE is 800. In a first time of iteration, the current node is node 1 (the node 1 is not a leaf node and its corresponding value is 500), 800 is greater than 500 and the node 1 has a right sub-tree, a root node of the right sub-tree (i.e. the node 4) is taken as the current node. In a second time of iteration, the current node is node 4, the node 4 is a leaf node, and it may be determined that the user identity of the UE falls within the user identity range indicated by the indication information.

It should be noted that how to determine whether the user identity of the UE falls within the user identity range is only illustrated above. However, this disclosure is not limited thereto; for example, other algorithms or representations may also be used. For example, Table 2 shows an algorithm of how to determine by taking binary search as an example.

TABLE 2

Determining by the UE through network configuration or protocol provisions that a maximum value of ue_indendity is M; setting initial values of a judgment range of the UE to be start = 0, end = M; where, start denotes a starting point of the ue_indendity of the judgment range, and end is an ending point of the ue_indendity of the judgment range.
Starting from the root node of the binary tree, and node by node, judging by the UE whether a value of the ue_indendity of the UE is within the value range denoted by the binary tree:
    If the node is a leaf node, it shows that the UE is paged, and the judgment process is terminated;
    otherwise,
        setting a median point mid = (start + end)/2 of the judgment range;
        if ue_indendity > mid, judging whether the current node has a right sub-tree;
            if it is judged yes, setting start = ceil(mid), and proceeding with judgment on its right sub-tree from the root node;
            otherwise, the current node does not have a right sub-tree, it shows that the UE is not paged, and the judgment process is terminated;
        otherwise, judging whether the current node has a left sub-tree:
            if it is judged yes, setting end = floor(mid), and proceeding with judgment on its left sub-tree from the root node;
            otherwise, the current node does not have a left sub-tree, it shows that the UE is not paged, and the judgment process is terminated.
Where, ceil( ) denotes round-up, and floor( ) denotes round-down.

It should be noted that FIG. 2 or 4 only schematically explains the embodiment of this disclosure; however, this disclosure is not limited thereto. For example, an order of execution of the blocks or steps may be appropriately adjusted, and furthermore, some other blocks or steps may be added, or some of these blocks or steps may be reduced. And appropriate modifications may be made by those skilled in the art according to what is described above, without being limited to those contained in these figures.

It can be seen from the above embodiment that whether the UE is notified by the network message is determined according to whether the user identity of the UE falls within the user identity range indicated by the indication information. Hence, a magnitude of a network message (such as a paging message) in the communication system (such as an NB-IoT system) may be greatly reduced, and more UEs may be notified (such as paged) by using relatively few resources.

Embodiment 2

The embodiment of this disclosure provides a network message notification method, with contents identical to those in Embodiment 1 being not going to be described herein any further.

Figure 5:
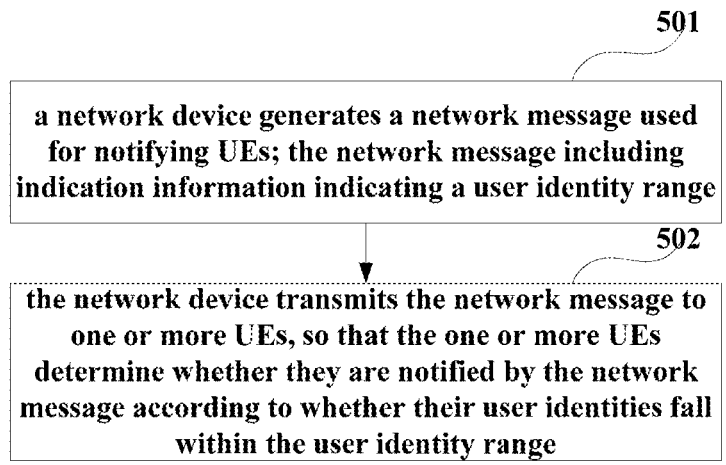
FIG. 5 is a schematic diagram of the network message notification method of Embodiment 2 of this disclosure.

FIG. 5 is a schematic diagram of the network message notification method of the embodiment of this disclosure, which shall be described from a network device side. As shown FIG. 5, the network message notification method includes:

Block 501: a network device generates a network message used for notifying UEs; the network message including indication information indicating a user identity range; and Block 502: the network device transmits the network message to one or more UEs, so that the one or more UEs determine whether they are notified by the network message according to whether their user identities fall within the user identity range.

In this embodiment, the indication information may indicate one or more user identity ranges; any UE of which user identity falls within the user identity range and which is capable of receiving the network message is the UE notified by the network message, or any UE of which user identity falls within the user identity range and which is capable of receiving the network message is the UE not notified by the network message.

For example, the network message is a paging message, the paging message being used to page one or more UEs; a UE of which user identity falls within the user identity range and which is capable of receiving the paging message is the UE paged by the paging message.

In this embodiment, the network device may further transmit a maximum value and/or a minimum value of a whole user identity range.

Figure 6:
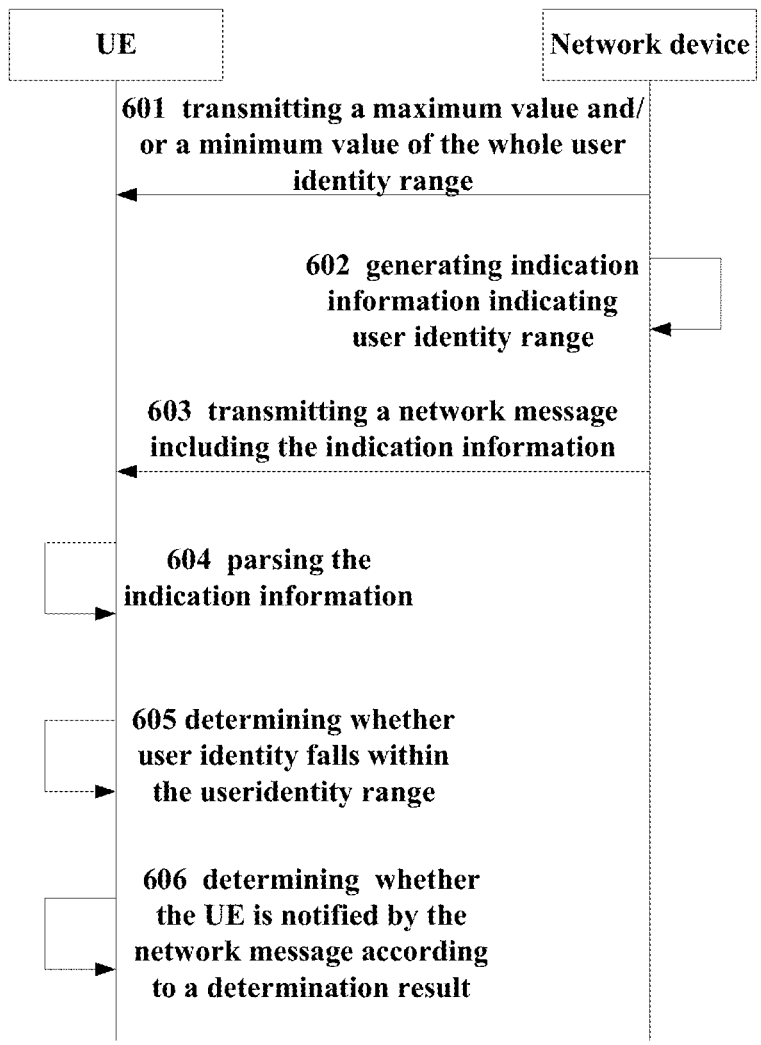
FIG. 6 is another schematic diagram of the network message notification method of Embodiment 2 of this disclosure.

FIG. 6 is another schematic diagram of the network message notification method of the embodiment of this disclosure, which shall be described from the network device side and a UE side. As shown FIG. 6, the network message notification method includes:

601: a network device transmits to a UE a maximum value and/or a minimum value of the whole user identity range;

602: the network device generates a network message used for notifying the UE, based on the whole user identity range and UE identities of UEs notified by the network message;

603: the network device transmits to the UE the network message including the indication information;

604: the UE parses the indication information;

605: the UE determines whether the user identity falls within the user identity range indicated by the indication information; and 606: the UE determines whether the UE is notified by the network message according to a determination result.

In this embodiment, the indication information may be multiple bits corresponding to a binary tree; and the whole user identity range [ue_indendity$_{min}$, ue_indendity$_{max}$] may be divided into multiple ranges by nodes of the binary tree, and each leaf node and a parent node of the leaf node correspond to a user identity range [ue_indendity$_j$, ue_indendity$_k$] notified by the network message; where, ue_indendity$_{min}$, ue_indendity$_{max}$, ue_indendity$_j$, ue_indendity$_k$ are all real numbers, and ue_indendity$_{min}$≤ue_indendity$_j$<ue_indendity$_k$≤ue_indendity$_{max}$.

How to generate the binary tree by the network device shall be described below schematically.

Figure 7:
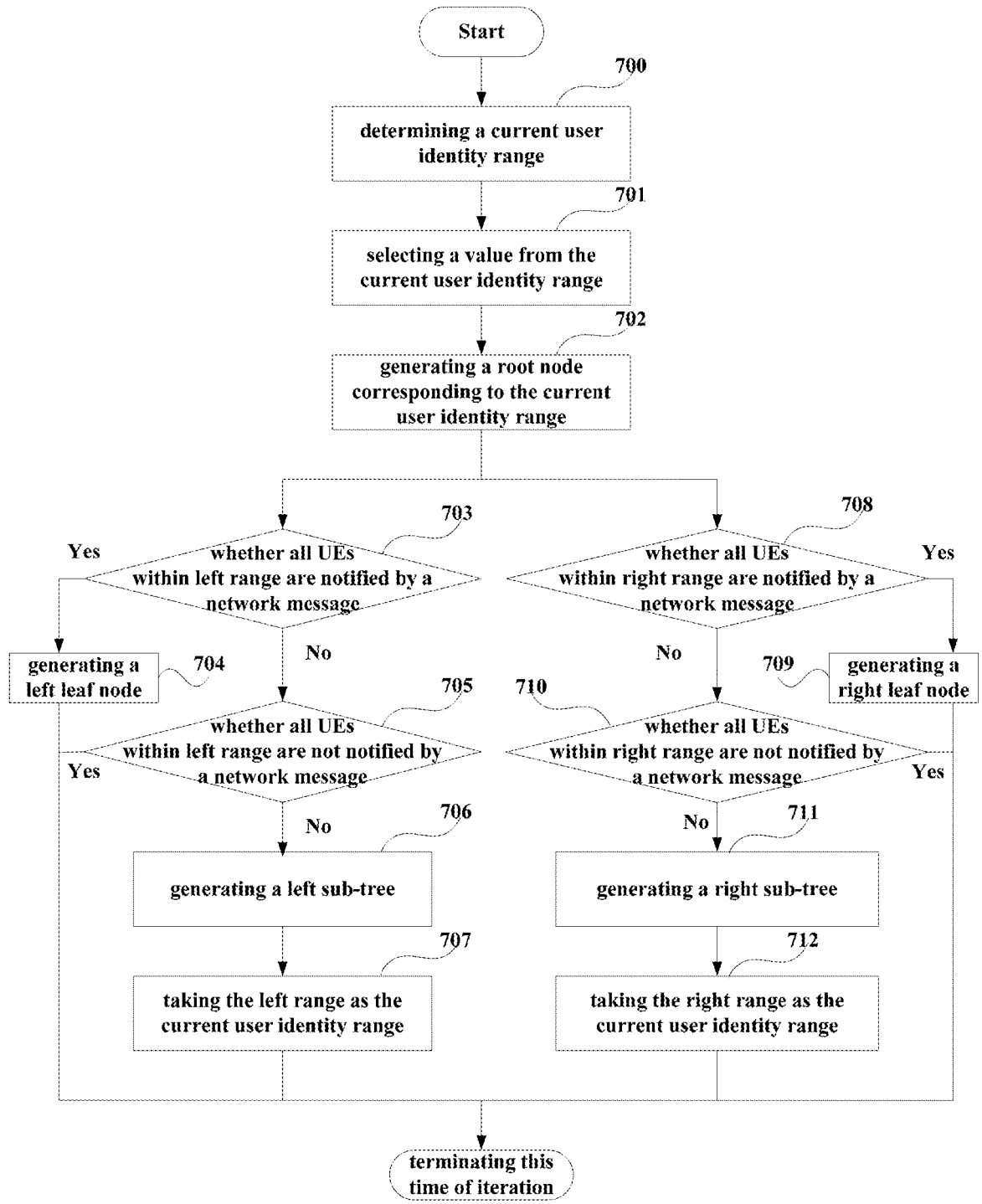
FIG. 7 is a schematic diagram of generating the user identity range of Embodiment 2 of this disclosure.

FIG. 7 is a schematic diagram of generating the user identity range of the embodiment of this disclosure, in which a time of iteration is particularly shown. As shown in FIG. 7, the method includes:

Block 700: a current identity range is determined;

in a first time of iteration, the whole user identity range is initialized as a current user identity range.

Block 701: a value is selected from the current user identity range, and the current user identity range is divided into a left range and a right range;

for example, the value is a median value mid=(start+end)/2 of the current user identity range; where, start denotes a starting point of the current user identity range, and end denotes an ending point of the current user identity range. However, this disclosure is not limited thereto. And for a method for selecting such values, an agreement is only needed to be made between the UE and the network device.

Block 702: a root node corresponding to the current user identity range is generated, and the rooting node corresponds to the above value of the current user identity range.

Block 703: it is determined whether all of the UEs of which the UE identities fall within the left range and which are capable of receiving the network message are the UEs notified by the network message, executing block 704 if it is determined yes, and executing block 705 if it is determined no.

Block 704: a left leaf node is generated for the root node to which the current user identity range corresponds, jumping out of this time of iteration, and proceeding with executing block 701 for performing next time of iteration.

Block 705: it is determined whether all of the UEs of which the UE identities fall within the left range and which are capable of receiving the network message are the UEs not notified by the network message, jumping out of this time of iteration if it is determined yes and proceeding with executing block 701 for performing next time of iteration, and executing block 706 if it is determined no.

Block 706: a left sub-tree is generated for the root node to which the current user identity range corresponds.

Block 707: the left range is updated to the current user identity range, jumping out of this time of iteration, and proceeding with executing block 701 for performing next time of iteration.

Block 708: it is determined whether all of the UEs of which the UE identities fall within the right range and which are capable of receiving the network message are the UEs notified by the network message, executing block 709 if it is determined yes, and executing block 710 if it is determined no.

Block 709: a right leaf node is generated for the root node to which the current user identity range corresponds.

Block 710: it is determined whether all of the UEs of which the UE identities fall within the right range and which are capable of receiving the network message are the UEs not notified by the network message, jumping out of this time of iteration if it is determined yes and proceeding with executing block 701 for performing next time of iteration, and executing block 711 if it is determined no.

Block 711: a right sub-tree is generated for the root node to which the current user identity range corresponds; and Block 712: the right range is updated to the current user identity range, jumping out of this time of iteration, and proceeding with executing block 701 for performing next time of iteration.

FIG. 7 only schematically shows a case of one time of iteration. And for each current node after being updated, the above blocks or steps may be executed iteratively, until all user identity ranges are processed, so as to generate the user identity range notified by the network message.

For example, it is assumed that the whole user identity range is [0, 1000], there are total 6 UEs being capable of receiving the paging message (such as monitoring PDCCHs at a corresponding PO) at a PO, and UE identities are 120, 150, 200, 400, 600, and 800, respectively; UEs of UE identities being 150, 200, 600, and 800 are paged, and UEs of UE identities being 120 and 400 are not paged.

In a first time of iteration, the current user identity range is [0, 1000], a value 500 is selected from the range, the value 500 dividing the current user identity range into a left range [0, 500] and a right range [500, 1000], and a root node (such as the node 1 shown in FIG. 3) is generated for the current user identity range [0, 1000].

Furthermore, there are 4 UEs of which the UE identities fall within the left range [0, 500] and which are capable of receiving the paging message, and their UE identities are 120, 150, 200, and 400, respectively; two of the 4 UEs (of which UE identities are 150 and 200, respectively) are paged by the paging message, and the other two UEs (of which UE identities are 120 and 400, respectively) are not paged by the paging message; a left sub-tree is generated for the root node (such as the node 1 shown in FIG. 3) of the current user identity range [0, 1000], and the left range [0, 500] is taken as the current user identity range.

Moreover, there are 2 UEs of which the UE identities fall within the right range [500, 1000] and which are capable of receiving the paging message, and their UE identities are 600 and 800, respectively; the 2 UEs are both paged by the paging message; and a right leaf node (such as the node 4 shown in FIG. 3) is generated for the root node (such as the node 1 shown in FIG. 3) of the current user identity range [0, 1000].

In a second time of iteration, the current user identity range is [0, 500], a value 250 is selected from the range, the value 250 dividing the current user identity range into a left range [0, 250] and a right range [250, 500], and a root node (such as the node 2 shown in FIG. 3) is generated for the current user identity range [0, 500].

Furthermore, there are 3 UEs of which the UE identities fall within the left range [0, 250] and which are capable of receiving the paging message, and their UE identities are 120, 150, and 200, respectively; two of the 3 UEs (of which UE identities are 150 and 200, respectively) are paged by the paging message, and the other UE (of which user identity is 120) is not paged by the paging message; a left sub-tree is generated for the root node (such as the node 2 shown in FIG. 3) of the current user identity range [0, 500], and the left range [0, 250] is taken as the current user identity range.

Moreover, there is one UE of which the user identity falls within the right range [250, 500] and which is capable of receiving the paging message, and its user identity is 400; and this UE is not paged by the paging message, and this time of iteration is jumped out.

In a third time of iteration, the current user identity range is [0, 250], a value 125 is selected from the range, the value 125 dividing the current user identity range into a left range [0, 125] and a right range [125, 250], and a root node (such as the node 3 shown in FIG. 3) is generated for the current user identity range [0, 250].

Furthermore, there is one UE of which the user identity falls within the left range [0, 125] and which is capable of receiving the paging message, and its user identity is 120; this UE is not paged by the paging message, and this time of iteration is jumped out. Till now, the whole user identity range [0, 1000] is processed, and the whole process may be terminated.

Thus, the binary tree shown in FIG. 3 may be generated. And then the binary tree shown in FIG. 3 may be converted into a binary string of bits "11100000" based on the correspondence rule shown in Table 1 by using the method of breadth-first traversal.

It should be noted that how to generate the user identity range is only illustrated above. However, this disclosure is not limited thereto; for example, other algorithms or representations may also be used. For example, Table 3 shows an algorithm of how to generate a binary tree by taking binary search as an example.

TABLE 3

First, [0, M] is taken as an initial search range. And following operations are performed iteratively:
    step 1: for any value range of ue_indendity that is to be looked up, a numeral median value is selected to divide the whole value range into two parts; according to distribution of paged UEs in the two parts of value range of ue_indendity, the operations are as follows:
      1.  if the part of the ue_indendity range of a relatively small value contains only UEs paged at the PO, but does not contain UEs not paged at the PO, the value range is no longer divided binarily, the binary tree grows with a leaf leftwards, and a left bit of the range is recorded as "1";
      2.  if the part of the ue_indendity range of a relatively small value contains only UEs not paged at the PO, but does not contain UEs paged at the PO, the value range is no longer divided binarily, the binary tree does not grow with a sub-tree (or a leaf) leftwards, and a left bit of the range is recorded as "0";
      3.  if the part of the ue_indendity range of a relatively small value contains UEs not paged at the PO and UEs paged at the PO, the value range needs to be further divided binarily, the binary tree grows with a sub-tree leftwards, and a left bit of the range is recorded as "1";
      4.  if the part of the ue_indendity range of a relatively large value contains only UEs paged at the PO, but does not contain UEs not paged at the PO, the value range is no longer divided binarily, the binary tree grows with a leaf rightwards, and a right bit of the range is recorded as "1";
      5.  if the part of the ue_indendity range of a relatively large value contains only UEs not paged at the PO, but does not contain UEs paged at the PO, the value range is no longer divided binarily, the binary tree does not grow with a sub-tree (or a leaf) rightwards, and a right bit of the range is recorded as "0";
      6.  if the part of the ue_indendity range of a relatively large value contains UEs not paged at the PO and UEs paged at the PO, the value range needs to be further divided binarily, the binary tree grows with a sub-tree rightwards, and a right bit of the range is recorded as "1";
    step 2: recording the two bits of left and right bits of the binary tree represented by the value range;
    step 3: if a value range needs to be further divided binarily, repeating the above steps 1-2, until binary division is not needed for any value range; and
    step 4: generation of a binary tree is completed.

It should be noted that FIG. 6 or 7 only schematically explains the embodiment of this disclosure; however, this disclosure is not limited thereto. For example, an order of execution of the blocks or steps may be appropriately adjusted, and furthermore, some other blocks or steps may be added, or some of these blocks or steps may be reduced. And appropriate modifications may be made by those skilled in the art according to what is described above, without being limited to those contained in these figures.

It can be seen from the above embodiment that whether the UE is notified by the network message is determined according to whether the user identity of the UE falls within the user identity range indicated by the indication information. Hence, a magnitude of a network message (such as a paging message) in the communication system (such as an NB-IoT system) may be greatly reduced, and more UEs may be notified (such as paged) by using relatively few resources.

Embodiment 3

The embodiment of this disclosure provides a network message notification apparatus, with contents identical to those in Embodiment 1 being not going to be described herein any further.

Figure 8:
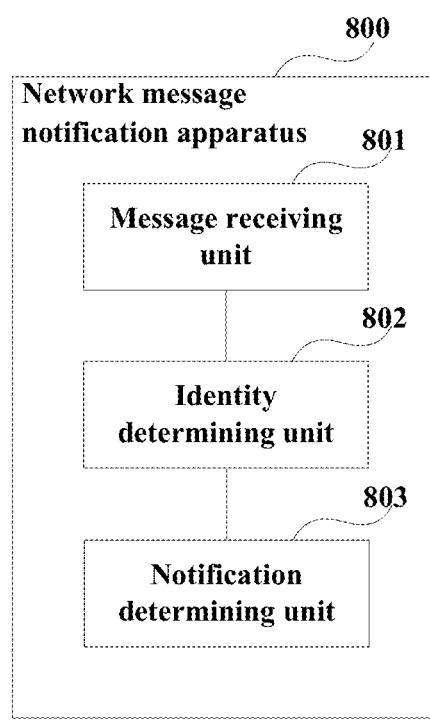
FIG. 8 is a schematic diagram of the network message notification apparatus of Embodiment 3 of this disclosure.

FIG. 8 is a schematic diagram of the network message notification apparatus of the embodiment of this disclosure. As shown in FIG. 8, the network message notification apparatus 800 includes:

a message receiving unit 801 configured to receive a network message transmitted by a network device; the network message including indication information indicating a user identity range;

an identity determining unit 802 configured to parse the indication information and determine whether a user identity of the UE falls within the user identity range indicated by the indication information; and a notification determining unit 803 configured to determine whether the UE is notified by the network message according to a determination result of the identity determining unit.

In this embodiment, the indication information may indicate one or more user identity ranges; all of the UEs of which the user identity falls within the user identity range and which are capable of receiving the network message are the UEs notified by the network message, or all of the UEs of which the user identity falls within the user identity range and which are capable of receiving the network message are the UEs not notified by the network message.

For example, the network message is a paging message, the paging message being used to page one or more UEs; and the notification determining unit 803 determines that a UE of which the user identity falls within the user identity range and which is capable of receiving the network message is the UE notified by the network message.

In this embodiment, the indication information may be multiple bits corresponding to a binary tree; and a whole user identity range [ue_indendity$_{min}$, ue_indendity$_{max}$] is divided into multiple ranges by nodes of the binary tree, and each leaf node and a parent node of the leaf node correspond to a user identity range [ue_indendity$_j$, ue_indendity$_k$] notified by the network message; where, ue_indendity$_{min}$, ue_indendity$_{max}$, ue_indendity$_j$, ue_indendity$_k$ are all real numbers, and ue_indendity$_{min}$≤ue_indendity$_j$<ue_indendity$_k$≤ue_indendity$_{max}$.

Figure 9:
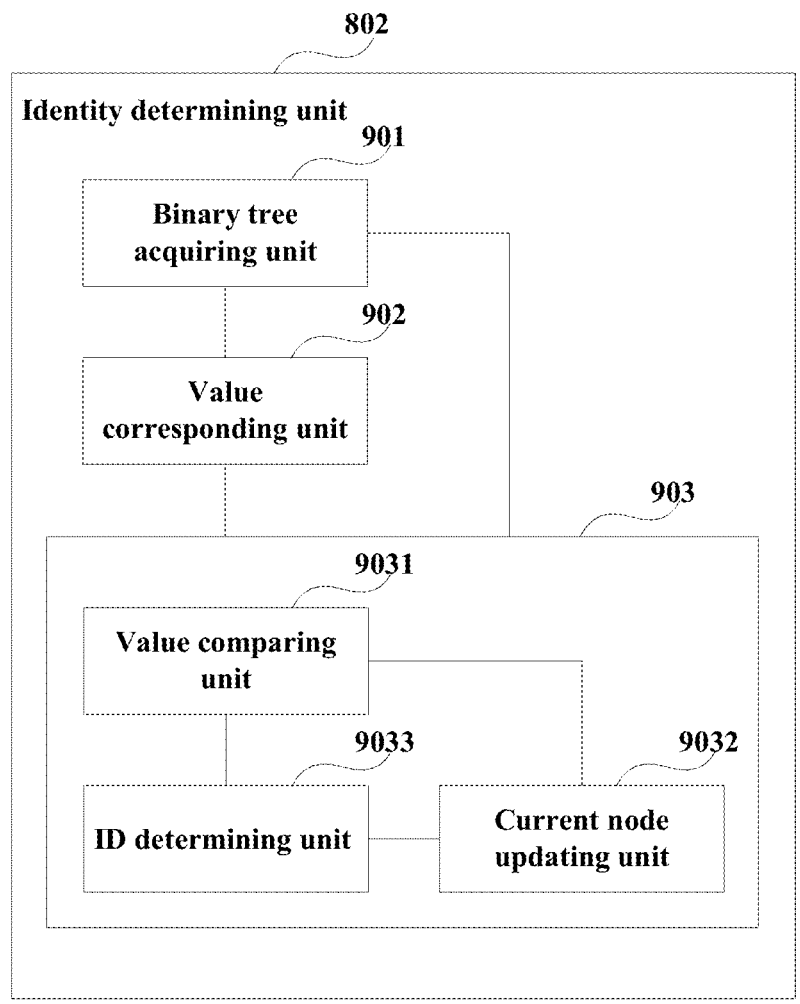
FIG. 9 is a schematic diagram of the identity determining unit of Embodiment 3 of this disclosure.

FIG. 9 is a schematic diagram of the identity determining unit of the embodiment of this disclosure. As show in FIG. 9, the identity determining unit 802 may include:

a binary tree acquiring unit 901 configure to obtain a corresponding binary tree based on the indication information;

a value corresponding unit 902 configured to, based on the whole user identity range, correspond each node of the binary tree to a value in the whole user identity range; and a binary tree lookup unit 903 configure to look up the binary tree based on the user identity of the UE, and determine whether the user identity of the UE falls within the user identity range indicated by the indication information according to a lookup result.

As show in FIG. 9, the binary tree lookup unit 903 may include:

a value comparing unit 9031 configured to, when a current node is not a leaf node, compare the user identity of the UE with a value to which the current node corresponds;

a current node updating unit 9032 configured to, when the user identity of the UE is greater than the value to which the current node corresponds and the current node has a right sub-tree, take a root node of the right sub-tree as the current node, or when the user identity of the UE is less than or equal to the value to which the current node corresponds and the current node has a left sub-tree, take a root node of the left sub-tree as the current node; and an ID determining unit 9033 configured to determine that the user identity of the UE falls within the user identity range indicated by the indication information when the current node is a leaf node; and the ID determining unit 9033 may further be configured to determine that the user identity of the UE does not fall within the user identity range indicated by the indication information, when the user identity of the UE is greater than the value to which the current node corresponds and the current node has no right sub-tree, or when the user identity of the UE is less than or equal to the value to which the current node corresponds and the current node has no left sub-tree.

In this embodiment, the network message notification apparatus 800 may further include: a range receiving unit (not shown in figures) configured to receive a maximum value and/or a minimum value of the whole user identity range transmitted by the network device.

This embodiment further provides a UE, configured with the network message notification apparatus 800 as described above.

Figure 10:
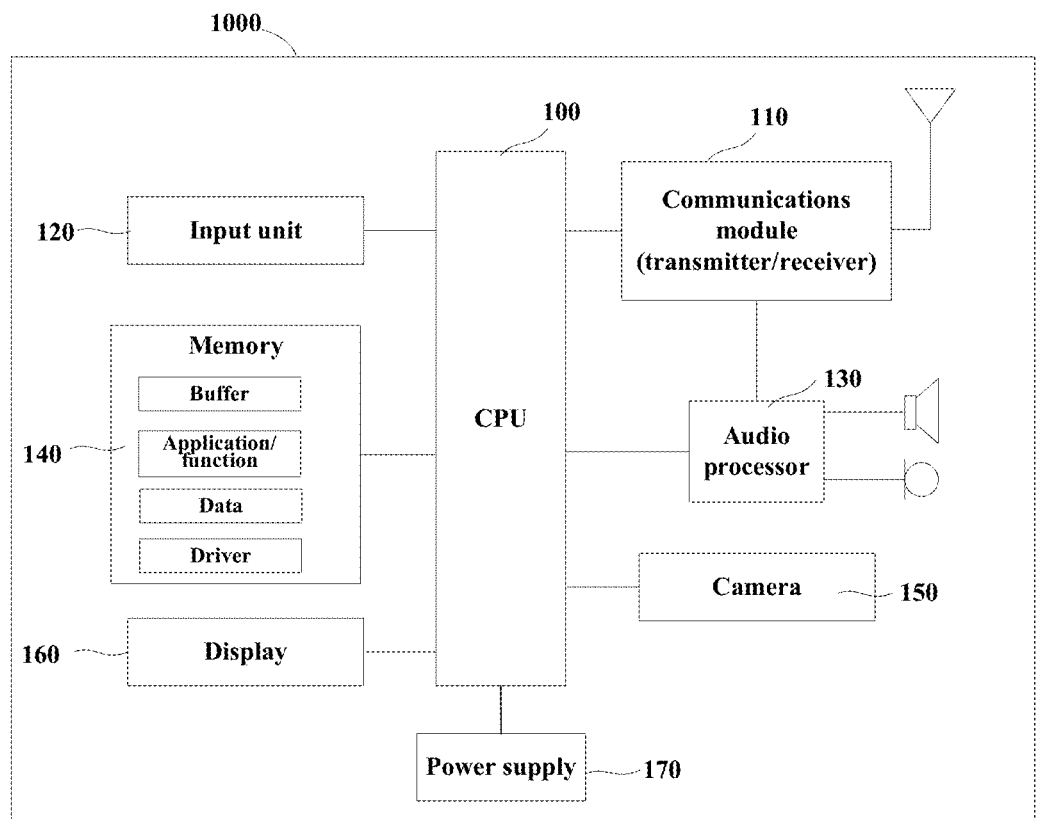
FIG. 10 is a schematic diagram of the UE of Embodiment 3 of this disclosure.

FIG. 10 is a schematic diagram of the UE of the embodiment of this disclosure. As shown in FIG. 10, the UE 1000 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions.

In one implementation, the functions of the network message notification apparatus 800 may be integrated into the central processing unit 100. The central processing unit 100 may be configured to carry out the network message notification method described in Embodiment 1.

For example, the central processing unit 100 may be configured to perform the following control: receiving a network message transmitted by a network device; the network message including indication information indicating a user identity range; parsing the indication information and determining whether a user identity of the UE falls within the user identity range indicated by the indication information; and determining whether the UE is notified by the network message according to a determination result.

In another implementation, the network message notification apparatus 800 and the central processing unit 100 may be configured separately. For example, the network message notification apparatus 800 may be configured as a chip connected to the central processing unit 100, with its functions being realized under control of the central processing unit.

As shown in FIG. 10, the UE 1000 may further include a communication module 110, an input unit 120, an audio processor 130, a memory 140, a camera 150, a display 160 and a power supply 170. Functions of the above components are similar to those in the relevant art, and shall not be described herein any further. It should be noted that the UE 1000 does not necessarily include all the parts shown in FIG. 10, and furthermore, the UE 1000 may include parts not shown in FIG. 10, and the relevant art may be referred to.

It can be seen from the above embodiment that whether the UE is notified by the network message is determined according to whether the user identity of the UE falls within the user identity range indicated by the indication information. Hence, a magnitude of a network message (such as a paging message) in the communication system (such as an NB-IoT system) may be greatly reduced, and more UEs may be notified (such as paged) by using relatively few resources.

Embodiment 4

The embodiment of this disclosure provides a network message notification apparatus, with contents identical to those in embodiments 1 and 2 being not going to be described herein any further.

Figure 11:
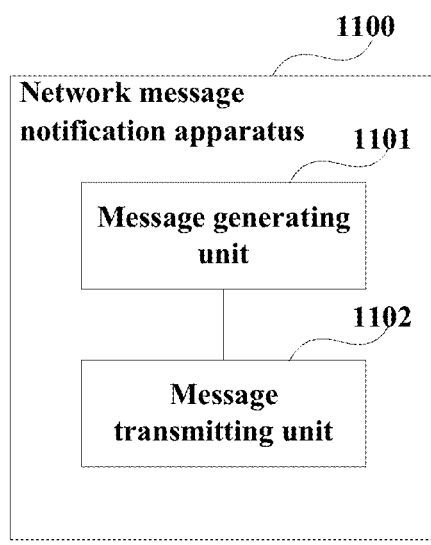
FIG. 11 is a schematic diagram of the network message notification apparatus of Embodiment 4 of this disclosure.

FIG. 11 is a schematic diagram of the network message notification apparatus of the embodiment of this disclosure. As shown in FIG. 11, the network message notification apparatus 1100 includes:

a message generating unit 1101 configured to generate a network message used for notifying UEs; the network message including indication information indicating a user identity range; and a message transmitting unit 1102 configured to transmit the network message to one or more UEs, so that the one or more UEs determine whether they are notified by the network message according to whether their user identities fall within the user identity range.

In this embodiment, the indication information may indicate one or more user identity ranges; any UE of which the user identity falls within the user identity range and which is capable of receiving the network message is the UE notified by the network message, or any UE of which the user identity falls within the user identity range and which is capable of receiving the network message is the UE not notified by the network message.

For example, the network message is a paging message, the paging message being used to page one or more UEs; and a UE of which the user identity falls within the user identity range and which is capable of receiving the paging message is the UE paged by the paging message.

Figure 12:
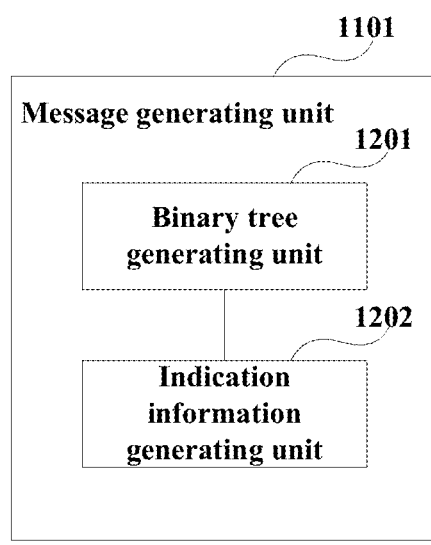
FIG. 12 is a schematic diagram of the message generating unit of Embodiment 4 of this disclosure.

FIG. 12 is a schematic diagram of the message generating unit of the embodiment of this disclosure. As shown in FIG. 12, the message generating unit 1101 may include:

a binary tree generating unit 1201 configured to generate a binary tree based on a whole user identity range and the user identity of the UE notified by the network message; and an indication information generating unit 1202 configured to generate multiple bits according to the binary tree; a whole user identity range [ue_indendity$_{min}$, ue_indendity$_{max}$] is divided into multiple ranges by nodes of the binary tree, and each leaf node and a parent node of the leaf node correspond to a user identity range [ue_indendity$_j$, ue_indendity$_k$] notified by the network message; ue_indendity$_{min}$, ue_indendity$_{max}$, ue_indendity$_j$, ue_indendity$_k$ are all real numbers, and ue_indendity$_{min}$≤ue_indendity$_j$<ue_indendity$_k$≤ue_indendity$_{max}$.

Figure 13:
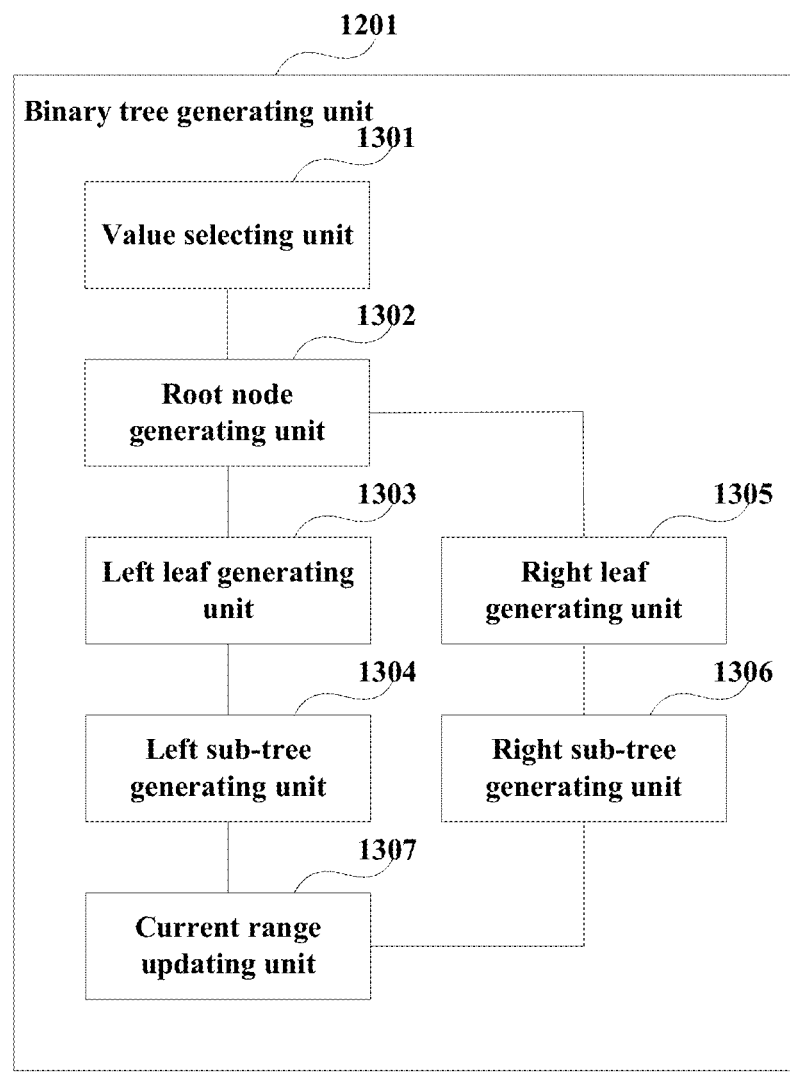
FIG. 13 is a schematic diagram of the binary tree generating unit of Embodiment 4 of this disclosure.

FIG. 13 is a schematic diagram of the binary tree generating unit of the embodiment of this disclosure. As shown in FIG. 13, the binary tree generating unit 1201 may include:

a value selecting unit 1301 configured to select a value from a current user identity range, and divide the current user identity range into a left range and a right range;

a root node generating unit 1302 configured to generate a root node to which the current user identity range corresponds, the root node corresponding to the value of the current user identity range;

a left leaf generating unit 1303 configured to generate a left leaf node for the root node when all of the UEs of which the UE identities fall within the left range and which are capable of receiving the network message are the UEs notified by the network message;

a left sub-tree generating unit 1304 configured to generate a left sub-tree for the root node when the UEs of which the UE identities fall within the left range and which are capable of receiving the network message include the UEs notified by the network message and the UEs not notified by the network message;

a right leaf generating unit 1305 configured to generate a right leaf node for the root node when all the UEs of which the UE identities fall within the right range and which are capable of receiving the network message are the UEs notified by the network message; and a right sub-tree generating unit 1306 configured to generate a right sub-tree for the root node when the UEs of which the UE identities fall within the right range and which are capable of receiving the network message include the UEs notified by the network message and the UEs not notified by the network message.

As shown in FIG. 13, the binary tree generating unit 1201 may further include:

a current range updating unit 1307 configured to update the left range to a current user identity range when the left sub-tree generating unit generates the left sub-tree, and update the right range to a current user identity range when the right sub-tree generating unit generates the right sub-tree.

In this embodiment, the network message notification apparatus 1100 may further include: a range transmitting unit (not shown in figures) configured to transmit a maximum value and/or a minimum value of the whole user identity range to the UE.

The embodiment of this disclosure further provides a network device, configured with the above network message notification apparatus 1100. The network device may be base station, or may be an MME; however, this disclosure is not limited thereto.

Figure 14:
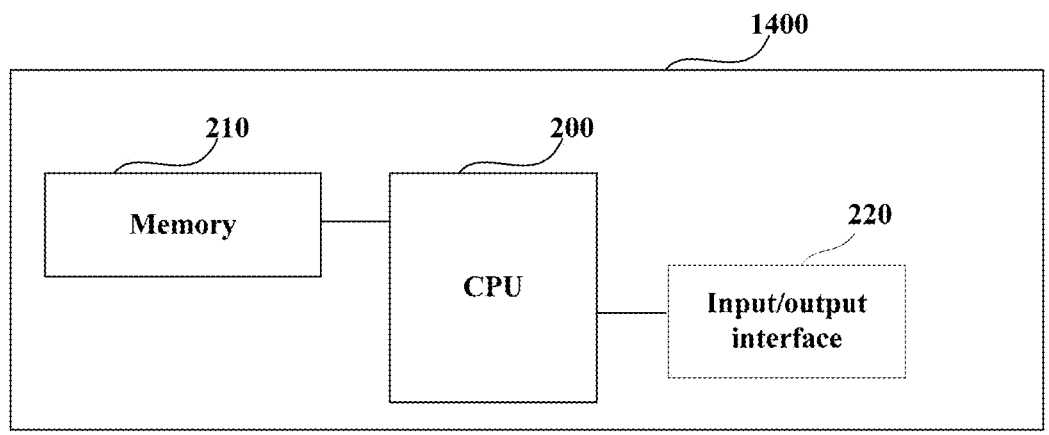
FIG. 14 is a schematic diagram of a structure of the network device of Embodiment 4 of this disclosure.

FIG. 14 is a schematic diagram of the network device of the embodiment of this disclosure. As shown in FIG. 14, the network device 1400 may include a central processing unit (CPU) 200 and a memory 210, the memory 210 being coupled to the central processing unit 200. The memory 210 may store various data, and furthermore, it may store a program for information processing, and execute the program under control of the central processing unit 200.

The network device 1400 may carry out the network message notification method described in Embodiment 2. And the central processing unit 200 may be configured to carry out the functions of the network message notification apparatus 1100.

For example, the central processing unit 200 may be configured to perform the following control: generating a network message used for notifying UE; the network message including indication information indicating a user identity range; and transmitting the network message to one or more UEs, so that the one or more UEs determine whether they are notified by the network message according to whether the user identity falls within the user identity range.

Furthermore, as shown in FIG. 14, the network device 1400 may include an input/output interface 220, etc. Functions of the above components are similar to those in the relevant art, and shall not be described herein any further. It should be noted that the network device 1400 does not necessarily include all the parts shown in FIG. 14, and furthermore, the network device 1400 may include parts not shown in FIG. 14, and the relevant art may be referred to.

It can be seen from the above embodiment that whether the UE is notified by the network message is determined according to whether the user identity of the UE falls within the user identity range indicated by the indication information. Hence, a magnitude of a network message (such as a paging message) in the communication system (such as an NB-IoT system) may be greatly reduced, and more UEs may be notified (such as paged) by using relatively few resources.

Embodiment 5

The embodiment of this disclosure provides a communication system, with contents identical to those in embodiments 1-4 being not going to be described herein any further.

Figure 15:
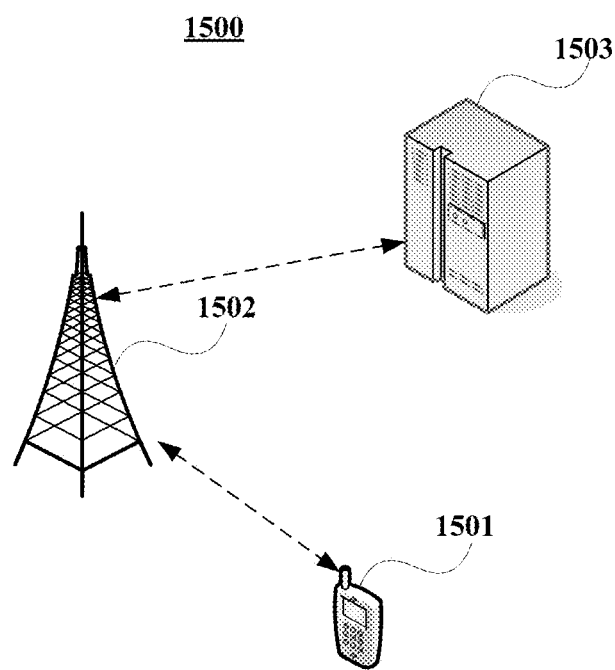
FIG. 15 is a schematic diagram of the communication system of Embodiment 5 of this disclosure.

FIG. 15 is a schematic diagram of the communication system of the embodiment of this disclosure. As shown in FIG. 15, the communication system 1500 includes a UE 1501, a base station 1502 and an MME 1503.

In this embodiment, the UE 1501 may be configured with the network message notification apparatus 800 described in Embodiment 3. And the base station 1502 and/or the MME 1503 may be configured with the network message notification apparatus 1100 described in Embodiment 4, that is, the base station 1502 and/or the MME 1503 may carry out the functions of the network device 1400.

An embodiment of the present disclosure provides a computer readable program code, which, when executed in a UE, will cause a computer unit to carry out the network message notification method described in Embodiment 1 in the UE.

An embodiment of the present disclosure provides a computer readable medium, including a computer readable program code, which will cause a computer unit to carry out the network message notification method described in Embodiment 1 in a UE.

An embodiment of the present disclosure provides a computer readable program code, which, when executed in a network device, will cause a computer unit to carry out the network message notification method described in Embodiment 2 in the network device.

An embodiment of the present disclosure provides a computer readable medium, including a computer readable program code, which will cause a computer unit to carry out the network message notification method described in Embodiment 2 in a network device.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A network message notification apparatus configured in a user equipment (UE), the network message notification apparatus comprising:
a memory that stores a plurality of instructions;
a processor that couples to the memory and configured to execute the plurality of instructions to:
receive a network message transmitted by a network device; the network message comprising indication information indicating a user identity range;
parse the indication information and determine whether a user identity of the UE falls within the user identity range indicated by the indication information; and
determine whether the UE is notified by the network message according to a determination result of whether a user identity of the UE falls within the user identity range indicated by the indication information, wherein the indication information is multiple bits corresponding to a binary tree, and wherein a whole user identity range (ue_indendity$_{min}$, ue_indendity$_{max}$) is divided into multiple ranges by nodes of the binary tree, and each leaf node and a parent node of the leaf node correspond to a user identity range (ue_indendity$_j$, ue_indendity$_k$) notified by the network message where ue_indendity$_{min}$, ue_indendity$_{max}$, ue_indendity$_j$, ue_indendity$_k$ are all real numbers, and ue_indendity$_{min}$≤ue_indendity$_j$<ue_indendity$_k$≤ue_indendity$_{max}$.

2. The network message notification apparatus according to claim 1, wherein the indication information indicates one or more user identity ranges;
wherein a UE of which a user identity falls within the user identity range and which is capable of receiving the network message is a UE notified by the network message, or a UE of which a user identity falls within the user identity range and which is capable of receiving the network message is a UE not notified by the network message.

3. The network message notification apparatus according to claim 1, wherein the network message is a paging message, the paging message being used to page one or more UEs, and wherein the processor is further configured to determine that a UE is paged by the paging message when the user identity of the UE falls within the user identity range indicated by the indication information.

4. The network message notification apparatus according to claim 1, wherein the processor is further configured to:
obtain a corresponding binary tree based on the indication information;
based on the whole user identity range, correspond each node of the binary tree to a value in the whole user identity range; and
look up the binary tree based on the user identity of the UE, and determine whether the user identity of the UE falls within the user identity range indicated by the indication information according to a lookup result.

5. The network message notification apparatus according to claim 4, wherein the processor is further configured to:
when a current node is not a leaf node, compare the user identity of the UE with a value to which the current node corresponds;
when the user identity of the UE is greater than the value to which the current node corresponds and the current node has a right sub-tree, take a root node of the right sub-tree as the current node, or, when the user identity of the UE is less than or equal to the value to which the current node corresponds and the current node has a left sub-tree, take a root node of the left sub-tree as the current node; and
determine that the user identity of the UE falls within the user identity range indicated by the indication information when the current node is a leaf node; and
determine that the user identity of the UE does not fall within the user identity range indicated by the indication information, when the user identity of the UE is greater than the value to which the current node corresponds and the current node has no right sub-tree, or, when the user identity of the UE is less than or equal to the value to which the current node corresponds and the current node has no left sub-tree.

6. The network message notification apparatus according to claim 1, wherein the processor is further configured to:
receive a maximum value and/or a minimum value of the whole user identity range transmitted by the network device.

7. A network message notification apparatus configured in a network device, the network message notification apparatus comprising:
a memory that stores a plurality of instructions;
a processor that couples to the memory and configured to execute the plurality of instructions to:
generate a network message used for notifying User Equipment (UE), the network message comprising indication information indicating a user identity range;
transmit the network message to one or more UEs, wherein the one or more UEs determine whether they are notified by the network message according to whether their user identities fall within the user identity range,
generate a binary tree based on a whole user identity range and UE identities of the UEs notified by the network message; and
generate multiple bits according to the binary tree,
wherein a whole user identity range (ue_indendity$_{min}$, ue_indendity$_{max}$) is divided into multiple ranges by nodes of the binary tree, and each leaf node and a parent node of the leaf node correspond to a user identity range (ue_indendity$_j$, ue_indendity$_k$) notified by the network message, and
where ue_indendity$_{min}$, ue_indendity$_{max}$, ue_indendity$_j$, ue_indendity$_k$ are all real numbers, and ue_indendity$_{min}$≤ue_indendity$_j$<ue_indendity$_k$≤ue_indendity$_{max}$.

8. The network message notification apparatus according to claim 7, wherein the indication information indicates one or more user identity ranges;
wherein a UE of which a user identity falls within the user identity range and which is capable of receiving the network message is a UE notified by the network message, or a UE of which a user identity falls within the user identity range and which is capable of receiving the network message is a UE not notified by the network message.

9. The network message notification apparatus according to claim 7, wherein the network message is a paging message, the paging message being used to page one or more UEs;
and a UE of which a user identity falls within the user identity range and which is capable of receiving the paging message is a UE paged by the paging message.

10. The network message notification apparatus according to claim 7, wherein the processor is further configured to:
select a value from a current user identity range, and divide the current user identity range into a left range and a right range;
generate a root node to which the current user identity range corresponds, the root node corresponding to the value of the current user identity range;
generate a left leaf node for the root node when all of the UEs of which the UE identities fall within the left range and which are capable of receiving the network message are UEs notified by the network message;
generate a left sub-tree for the root node when the UEs of which the UE identities fall within the left range and which are capable of receiving the network message comprise the UEs notified by the network message and UEs not notified by the network message;
generate a right leaf node for the root node when all of the UEs of which the UE identities fall within the right range and which are capable of receiving the network message are the UEs notified by the network message; and
generate a right sub-tree for the root node when the UEs of which the UE identities fall within the right range and which are capable of receiving the network message comprise the UEs notified by the network message and the UEs not notified by the network message.

11. The network message notification apparatus according to claim 10, wherein the processor is further configured to update the left range to a current user identity range when generating the left sub-tree, and update the right range to a current user identity range when generating the right sub-tree.

12. The network message notification apparatus according to claim 7, wherein the processor is further
configured to transmit a maximum value and/or a minimum value of the whole user identity range to the UE.

13. A communication system, comprising:
a network device comprising:
a memory that stores a plurality of instructions;
a processor that couples to the memory and configured to execute the plurality of instructions to:
generate a network message used for notifying User Equipment (UE), the network message comprising indication information indicating a user identity range;
transmit the network message to one or more UEs, wherein the one or more UEs determine whether they are notified by the network message according to whether their user identities fall within the user identity range,
generate a binary tree base on a whole user identity range and UE identities of the UEs notified by the network message; and
generate multiple bits according to the binary tree,
wherein a whole user identity range (ue_indendity$_{min}$, ue_indendity$_{max}$) is divided into multiple ranges by nodes of the binary tree, and each leaf node and a parent node of the leaf node correspond to a user identity range (ue_indendity$_j$, ue_indendity$_k$) notified by the network message; and
a UE configured with a network message notification apparatus, comprising:
a memory that stores a plurality of instructions;
a processor that couples to the memory and configured to execute the plurality of instructions to:
receive the network message transmitted by the network device; the network message comprising the indication information indicating the user identity range;
parse the indication information and determine whether a user identity of the UE falls within the user identity range indicated by the indication information; and
determine whether the UE is notified by the network message according to a determination result of whether a user identity of the UE falls within the user identity range indicated by the indication information,
wherein the indication information is multiple bits corresponding to the binary tree, and wherein the whole user identity range (ue_indendity$_{min}$, ue_indendity$_{max}$) is divided into multiple ranges by nodes of the binary tree, and each leaf node and the parent node of the leaf node correspond to the user identity range (ue_indendity$_j$, ue_indendity$_k$) notified by the network message, and
wherein ue_indendity$_{min}$, ue_indendity$_{max}$, ue_indendity$_j$, ue_indendity$_k$ are all real numbers, and ue_indendity$_{min}$≤ue_indendity$_j$<ue_indendity$_k$≤ue_indendity$_{max}$.

* * * * *